United States Patent [19]

Bolte et al.

[11] Patent Number: 5,371,118
[45] Date of Patent: Dec. 6, 1994

[54] DISPERSION-BASED HEAT-SEALABLE COATING

[75] Inventors: Gerd Bolte, Monheim; Guenther Henke, Neuss; Ulrike Brueninghaus, Erkrath, all of Germany

[73] Assignee: Henkel Kommanditgesellschaft auf Aktien, Duesseldorf, Germany

[21] Appl. No.: 952,824
[22] PCT Filed: May 8, 1991
[86] PCT No.: PCT/EP91/00861
  § 371 Date: Nov. 17, 1992
  § 102(e) Date: Nov. 17, 1992
[87] PCT Pub. No.: WO91/18071
  PCT Pub. Date: Nov. 28, 1991

[30] Foreign Application Priority Data

May 17, 1990 [DE] Germany ............... 4015858

[51] Int. Cl.$^5$ ................ C08K 3/20; C08L 63/02
[52] U.S. Cl. ..................... 523/412; 523/418
[58] Field of Search ................ 523/412, 418

[56] References Cited

U.S. PATENT DOCUMENTS

| | | | |
|---|---|---|---|
| 3,663,652 | 5/1972 | Cannon et al. | 260/830 P |
| 3,971,745 | 7/1976 | Carlson et al. | 260/29.2 |
| 4,240,942 | 12/1980 | Wenzel et al. | |
| 4,581,395 | 4/1986 | Nakaya et al. | 523/412 |
| 4,772,643 | 9/1988 | Ernest et al. | 523/414 |

FOREIGN PATENT DOCUMENTS

| | | |
|---|---|---|
| 0000568 | 2/1979 | European Pat. Off. |
| 0126297 | 11/1984 | European Pat. Off. |
| 0201715 | 11/1986 | European Pat. Off. |
| 52-112676 | 5/1987 | Japan. |
| 2019425 | 10/1979 | United Kingdom. |
| 90 06330 | 6/1990 | WIPO. |

OTHER PUBLICATIONS

Chemical Abstract, JP 87/153371, 1988.
Chemical Abstract, JP 85/118781, 1986.
Ullmann, Eczyklopaedie der technischen Chemie, vol. 10, 1974, pp. 563–580 (1973).
Ullmann, vol. 19, pp. 11–21, 132–165, and 370–373 (1973).
Encyclopedia of Polymer Science and Engineering, vol. 6, 1986, pp. 1–51.

Primary Examiner—Melvyn I. Marquis
Assistant Examiner—D. Aylward
Attorney, Agent, or Firm—Ernest G. Szoke; Wayne C. Jaeschke; Daniel S. Ortiz

[57] ABSTRACT

The invention is a two-component film-forming reactive system for heat-sealable materials. The composition contains at least one resin which is curable with an epoxide and an epoxide compound as a curing agent. The resin which is curable with the epoxide is a mixture of a carboxyl or hydroxyl terminated polyurethane with an acrylate or methacrylate polymer or copolymer having hydroxyl or carboxyl groups.

18 Claims, No Drawings

DISPERSION-BASED HEAT-SEALABLE COATING

FIELD OF THE INVENTION

This invention relates to two-component film-forming reactive systems for the surface bonding and/or coating of substrates, more particularly for heat-sealable coatings, based on aqueous dispersions of
at least one resin (I) curable with epoxides and
epoxide compounds as curing agent (II) and to their use. The invention also relates to a process for the production of composites and adhesive-coated substrates.

BACKGROUND OF THE INVENTION

Special adhesive systems are required for the production of laminates and composites, but especially for the production of base materials for flexible printed circuits. Systems such as these have to meet very stringent requirements because, on the one hand, materials that are difficult to bond, such as copper foils for example, have to be bonded to polyimide films and, on the other hand, the composites have to be flexible and also highly heat-resistant. Solvent-containing adhesive systems based on modified polyurethane, polyester, acrylate and epoxy resins are known to the expert for such purposes. In addition to the basic solvent problem, systems of the type in question are often attended by the disadvantage that the cure times are far too long, for example up to 14 days in the case of polyurethane adhesive systems, or the curing temperatures are too high, for example up to 240° C. in the case of epoxy resin or acrylate systems. Water-based systems have been developed with a view to eliminating the solvent problem. Thus, JP 87/153371 and JP 85/118781 describe water-based adhesives for flexible printed circuits which contain dispersions of acrylate (co)polymers and epoxide compounds. A major disadvantage of systems such as these are their relatively long cure times, for example 16 hours at 130° C. in the case of JP 87/153371. JP 87/112676 describes waterborne polyurethane adhesives based on polyurethane dispersions (A) obtained from polytetramethylene glycol (MW 400 to 2000), an organic diisocyanate and a dimethylol carboxylic acid and also hydrazine or dihydrazides as chain-extending agents neutralized with tertiary amines and a water-soluble compound (B) containing 2 or more epoxide or aziridine rings per molecule. Although it is mentioned as an example that various films, for example PET and polypropylene, can be bonded to one another with this adhesive, there is no suggestion that adhesives of the type in question could be suitable for heat-sealable coatings. In addition, there are no references to the production of non-blocking coatings or to the special use for the production of flexible printed circuits.

Accordingly, the problem addressed by the present invention was to provide water-based reactive systems which would be capable of achieving high bond strengths, even in the case of difficult substrates, such as polyimides. In addition, the invention set out to guarantee high flexibility, high insulation resistance, high heat resistance and high solder bath resistance. The cure time would be relatively short and the curing temperature below 200° C. In addition, the particular need for blocking resistance would be satisfied. By blocking resistance is meant the non-tackiness of a film—which has been produced by coating of a substrate with the reactive system according to the invention and subsequent drying—at typical room and storage temperatures. In addition, the invention would provide a new raw material base or a different class of polymers as starting material for such systems.

BRIEF SUMMARY OF THE INVENTION

According to the invention, this problem has been solved by two-component film-forming reactive systems for the surface-to-surface bonding and/or coating of substrates, more particularly for heat-sealable coatings, based on aqueous dispersions of at least one resin (I) curable with epoxides and epoxide compounds as curing agents (III), characterized in that polyurethane polymers containing functional groups reactive to epoxides and, if desired, other resins are present as the curable resin (Ia).

Accordingly, the two-component reactive system according to the invention contains dispersions of a resin (I) curable with epoxides and dispersed epoxide compounds as curing agent (II). In contrast to the two Japanese applications cited above, the curable resin (Ia) present in (I) consists of polyurethane polymers containing functional groups reactive to epoxides. Amino, carboxyl and/or hydroxyl groups are particularly suitable as reactive functional groups. Carboxyl groups are preferred. Polyurethane polymers modified in this way are known to the expert.

DETAILED DESCRIPTION OF THE INVENTION

Basically, there are several starting materials which are suitable for the production of polyurethanes. They may be roughly divided into the so-called polyol component and the so-called isocyanate component. Among the polyols, polyester polyols, polyether polyols and polyester polyether polyols are of particular importance. Polyurethanes based on polyester polyols are preferred for the purposes of the invention. They are generally obtained by reaction of polyhydric alcohols with polybasic carboxylic acids. Suitable isocyanates for the production of polyurethanes are, for example, aliphatic, aromatic and/or alicyclic polyfunctional isocyanates. 4,4'-Diphenyl methane diisocyanate (MDI), isophorone diisocyanate (IPDI), tolylene diisocyanate (TDI) and tetramethyl xylene diisocyanate (TMXDI) are mentioned as examples. Further references to the broad spectrum of suitable polyol and isocyanate components can be found by the expert in the relevant specialist and patent literature on polyurethanes, for example published European patent application 354 471. The chain-extending step mentioned therein is also possible. However, for the reasons of physiological harmlessness stated therein, the chain-extending agents used should not be physiologically unsafe, such as, for example, hydrazine, diaminodiphenyl methane or the isomers of phenyl diamine and also the carbohydrazides or hydrazides of dicarboxylic acids.

The introduction of the above-mentioned epoxide-reactive functional groups into the polymer chain is also known in principle to the expert. For example, hydroxy-functional polyurethanes can be obtained by selecting a ratio of OH to NCO groups of greater than 1 for the reaction of the polyol and isocyanate components. Carboxyl groups, for example, can be introduced by partly adding dihydroxycarboxylic acids to the polyol component before its reaction with the isocyanate component. Suitable aminofunctional polyurethanes can be obtained, for example, by reaction of isocyanate-functional polyurethanes with polyfunctional amino compounds providing fewer isocyanate groups are present. Further references to the introduction of such functional groups, more particularly the carboxyl groups particularly preferred for the purposes of the invention, can also be found in the published European patent application cited above.

Suitable polyurethane polymers may also contain different epoxide-reactive groups. However, those in which the sum of acid value, OH value and amine value is, on average, 0.1 to 40 are particularly suitable. Polyurethane polymers in which the sum mentioned is between 0.3 and 20 are particularly suitable. A range of 0.5 to 5 is preferred. Basically, polyurethanes containing on average at least two epoxide-reactive functional groups are preferred for the purposes of the invention. Among these polymers, those in which these reactive groups are terminally positioned are particularly suitable. Polyurethanes having an average molecular weight of approximately 7,000 to 50,000 are preferred in terms of performance properties, particularly flexibility and bond strength. Particularly good results are obtained with polyurethanes having an average molecular weight in the range from 10,000 to 30,000. Both here and in the following, the average molecular weight is understood to be the weight average.

Suitable epoxide compounds are known to the expert from the patent literature and from encyclopedias. For example, the production of epoxides, their properties and uses are described in detail in Ullmann Enzyklopä die der technischen Chemie, 4th Edition, Vol. 10, Verlag Chemie, Weinheim/Bergstrasse 1974, pages 563 et seq. Industrially the most important epoxide compounds include those based on bisphenol A and/or novolak. Besides these, heterocyclic epoxides are also particularly suitable. Epoxy resin dispersions are used in accordance with the invention. In principle, any dispersible epoxy resins are suitable. This applies both to emulsifier-containing dispersions and to corresponding self-emulsifying systems. Epoxide compounds such as triglycidyl isocyanurate, polyethylene glycol diglycidyl ether or sorbitol polyglycidyl ether are also suitable. The dispersible epoxy resins may also be completely or partly replaced by water-soluble epoxide compounds. The epoxides suitable for the purposes of the invention preferably contain on average at least two epoxy groups. Epoxide compounds having an epoxide equivalent in the range from 100 to 4,000 are particularly preferred. An epoxide equivalent is understood to be the quantity in grams which contains 1 mol epoxide. Particularly good results are obtained with epoxide compounds in which this value is between 150 and 600.

In one preferred variant of the invention, the dispersion of a resin (I) curable with epoxides contains acrylate and/or methacrylate homopolymers or copolymers containing carboxyl and/or methylol groups in dispersed form as a further curable resin (Ib) in addition to the polyurethanes (Ia) already described in detail. (Meth)acrylate polymers modified in this way are known to the expert. Acrylic acid and methacrylic acid and also salts and esters thereof are mentioned by way of example as suitable (meth)acrylates for the production of such polymers. The alcohol component of these esters preferably contains 1 to 6 carbon atoms. Among the polymer dispersions or emulsions used in accordance with the invention, it is useful to resort to those which have been produced by emulsion polymerization.

The monomers mentioned may of course also be (co)polymerized with other ethylenically unsaturated monomers providing they are copolymerizable. Suitable monomers of this type are any of those containing ethylenically unsaturated or vinylic groups.

The vinyl compounds include, for example, vinyl chloride; vinyl esters, such as vinyl acetate, vinyl propionate; vinyl fatty acid esters, such as vinyl laurate, and vinyl alcohol. Suitable styrene compounds are styrene, halostyrenes, such as chlorostyrene, fluorostyrene and iodostyrene; alkyl styrenes, such as methyl styrene and 2,4-diethyl styrene; cyanostyrenes, hydroxystyrenes, nitrostyrenes, aminostyrenes and/or phenyl styrenes. Suitable derivatives of the acrylic compounds also include acrylonitrile for example. The carboxyl groups present in accordance with the invention in the polymers described above may be introduced, for example, by the co-use of acrylic acid and/or methacrylic acid as monomers in the polymerization. Methylol groups are obtained, for example, by the co-use of hydroxystyrenes or by the copolymerization of vinyl acetate and subsequent saponification.

As already mentioned, it has long been known to the expert that monomers of the type in question can be added to form polymers under emulsion polymerization conditions in an aqueous medium, as described for example in Ullmann loc. cit., Vol. 19, pages 11–21, pages 132 eq seq. and pages 370–373 and in Encyclopedia of Polymer Science and Engineering, Volume 6, Wiley & Sons, New York 1986, pages 1 to 51. Suitable monomers include, for example, vinyl compounds, the acrylates already mentioned and corresponding derivatives.

(Meth)acrylate/styrene/acrylonitrile copolymers or butyl methacrylate/acrylonitrile copolymers are mentioned as examples of suitable polymers for the purposes of the invention. Homopolymers of acrylic acid and methacrylic acid are also suitable. The polymers described above are particularly preferred when they have an average molecular weight of 50,000 to 300,000. Homopolymers or copolymers in which the sum of the acid value and the OH value is between 1 and 40 are preferred for the purposes of the invention. Particularly good results are obtained with the polymers mentioned when the sum in question is between 3 and 15 and, more particularly, between 4 and 10.

So far as performance results are concerned, particular significance is attributed to the ratio of the curable resins. According to the invention, the ratio by weight between the curable resins (Ia) and (Ib) is preferably in the range from 100:0 to 20:80. On the whole, the film formed from the reactive system will be more flexible with increasing polyurethane component while any increase in the percentage content of the other curable resin will promote heat resistance. Even a relatively small percentage of (Ib) leads to distinctly improved heat resistance values. Accordingly, a preferred range is between 99:1 and 25:75. A particularly optimal and, hence, preferred ratio of (Ia) to (Ib) is between 98:2 and 50:50. The ratios mentioned are based on the solids content of the dispersion.

The ratio of curable resin (I) to curing agent (II) is also of particular importance. The ratios of the individual components to one another and the specification of these components—by mutual interplay—naturally influence the performance properties of the reactive systems according to the invention and the films formed from them. Thus, reactive systems covering a broad spectrum of performance properties can be formulated through the ratio between the quantities in which the individual components are used and through the molecular weights and functionalities of the components. Thus, it is possible to compose both formulations having a high initial tack and also formulations which produce coatings of particularly high blocking resistance. Accordingly, the ratio by weight of resin (I) to curing agent (II) may vary over a preferred range of 1:5 to 10:1. A range of 1:1 to 5:1, in which optimal results are obtained, is particularly preferred.

In one particular embodiment of the invention, the reactive systems may also contain typical additives in a total quantity of up to 30% by weight, based on the total solids content of the reactive system, in addition to the dispersions of resin (I) and curing agent (II). A few typical additives are mentioned by way of example in the following. Catalysts such as, for example, tertiary amines or phosphoric acid or derivatives thereof may be present, preferably in quantities of up to 1% by weight. Coupling agents, such as silanes, titanates and zirconates, may be present in a quantity of up to 1% by weight. In order to keep the surface open for a long time during film formation, high-boiling solvents may be added in quantities of up to 5% by weight. Foam inhibitors and wetting agents are typically present in quantities of up to 2% by weight. Acid anhydrides or even styrene/maleic anhydride resins, for example, may be present as crosslinking agents or wetting agents in quantities of up to 10% by weight. A flexibilizer, for example NBR rubber having a molecular weight of 30,000 to 200,000, may be added in quantities of up to 10% by weight for special requirements. Polyesters having an average molecular weight of approximately 600 to 15,000 or even glycol ethers may be present as plasticizers in quantities of up to 5% by weight. Other possible additives, such as flameproofing agents, preservatives, etc., and effective quantities thereof are known to the expert from the literature and will not be mentioned in any more detail here. The percentages by weight mentioned above are also based on the total solids content of the reactive system which is preferably in the range from 30% by weight to 75% by weight and, more preferably, in the range from 40% by weight to 65% by weight.

Adhesive-coated substrates which are suitable, for example, for the production of flexible printed circuits can be produced with the reactive systems according to the invention. To this end, the reactive system is applied to the substrate, for example a metal foil, such as copper foil, after thorough mixing of the dispersions of resins (I) and curing agent (II). This may be done by roll coating, spray coating, spread coating, knife coating or dip coating. The reactive system is generally applied in a layer thickness of 15 to 40 μm and preferably in a layer thickness of 20 to 25 μm. The substrate thus coated is then dried at a temperature below the reactivation temperature. Accordingly, the drying temperature should not exceed 120° C. to any significant extent, if at all. Drying may be carried out, for example, in typical drying tunnels. With a typical drying tunnel 4 meters in length, the coating of films in accordance with the invention can be carried out at film speeds of 5 to 10 meters per minute, for example at temperatures of 120° C. and with an air throughput of approximately 4,000 m³ per hour. The adhesive-coated substrate obtained in this way is resistant to blocking, i.e. is not tacky at normal storage and room temperatures.

Blocking-resistant systems of this type have the advantage over the prior art that the substrate does no have to be covered with an additional protective film on its coated side for storage. Films coated in accordance with the invention can thus be stored in the form of rolls free from protective layers or cover films. Accordingly, there is no protective film or cover film to be removed in the practical application of the coated substrates produced in accordance with the invention. The substrates coated in accordance with the invention may be used in a process for the production of laminates or composites. To this end, the substrates are hot-pressed with another substrate. By this is meant that the adhesive-coated substrate is reactivated by heat, applied under pressure to the other substrate and subsequently cured. The pressure applied during the hot-pressing step depends upon the type of machine involved and is typically in the range from 5 to 200 bar, depending on the laminates or compositions to be produced. Establishing the optimal pressure for the particular combination is within the capability of the expert from experience. Reactivation and curing preferably take place at temperatures between 100° C. and 170° C. Another advantage of the invention in this regard lies in the short cure times which may be between 30 and 60 minutes.

The reactive systems according to the invention may of course also be used for the in-line production of laminates and composites. In this case, there is no need for intermediate storage. Instead, after coating and drying of the applied reactive system, the substrates are joined to one another immediately afterwards (in-line), typically under heat (60° C. to 170° C.) and pressure, and the reactive system is cured, preferably at around 60° C. to 170° C. Accordingly, there is no need for temporary storage of the coated substrate (off-line process). Both in the case of the in-line process and in the case of the off-line process, it is of course possible to produce laminates or composites with more than two substrates which may consist of a variety of different materials. In the case of in-line lamination, the expert—as already described—can select the ratio of the resins (Ia) and (Ib) to one another and to the curing component in such a way that the reactive system according to the invention has a somewhat higher initial tack. Although this is often at the expense of blocking resistance, this property is not crucial in the in-line process.

Accordingly, the reactive systems according to the invention are particularly suitable for the production of multilayer composites or laminates. The substrates may be metal foils, plastic films, woven fabrics, nonwovens, special papers and/or paperboards. Copper, aluminium, lead and constantan foils are mentioned as examples of metal foils. Suitable plastic films are films based on polyethylene terephthalate (PETP), polyimide (PI), polycarbonate (PC), polyether ether ketone (PEEK) and so-called liquid crystal polymers (LCP). Woven cloths of PETP or polyamide (PA) are also suitable substrates. Suitable nonwovens are those of PETP or polyaramide. Among special papers and paperboards, those based on polyaramide or presspahn are also suitable.

Under the effect of heat and pressure as described above, copper foils coated in accordance with the invention in conjunction with other flexible substrates, such as Kapton ® or polyester film, give composites which are suitable for the production of flexible printed circuits. The corresponding further processing of films provided with heat-sealable coatings is known as dry lamination.

After heat curing, the reactive systems according to the invention give films which show high mechanical, thermal and chemical stability in the laminates or composites mentioned. In addition to the production of high-temperature-resistant flexible printed circuits, the reactive systems according to the invention may also be used for the production of high-temperature-resistant insulating materials. Insulating materials in this context are understood in particular to be cable sheaths, cover films for circuits and windings for coils.

The invention is illustrated by the following Examples.

EXAMPLES

Example 1

A water-based reactive system according to the invention contains in dispersed form
- 5 pbw of a carboxyfunctional polyester urethane having an average molecular weight of approx. 25,000 and an acid value of 0.7±0.3
- 5 pbw of a methyl methacrylate/butyl methacrylate/acrylonitrile copolymer having an average molecular weight of approx. 100,000 and an acid value of 5.5±0.5 and
- 5 pbw of an epoxide based on bisphenol A having an epoxide equivalent of approx. 500.

After drying at approx. 120° C., the above-mentioned formulation gives blocking-resistant films.

Example 2

A water-based reactive system according to the invention contains in dispersed form
- 31 pbw of a carboxyfunctional polyurethane having an average molecular weight of approx. 25,000 and an acid value of 0.7±0.3
- 8 pbw of a carboxyfunctional polyurethane having an average molecular weight of approx. 10,000 and an acid value of 0.7±0.3
- 1 pbw of a methyl methacrylate/butyl methacrylate/acrylonitrile copolymer having an average molecular weight of approx. 100,000 and an acid value of 5.5±0.5,
- 5 pbw of an epoxide based on bisphenol A having an epoxide equivalent of approx. 500 and
- 5 pbw of an epoxide based on bisphenol A having an epoxide equivalent of 170.

After drying, this reactive system gives a coating of high initial tack and is particularly suitable for in-line lamination.

In Examples 1 and 2, all quantities are based on the particular solids content. pbw=parts by weight.

Example 3

A reactive system according to Example 1 was applied to a 35 μm thick copper foil in a layer thickness of 20 to 25 μm. A 20 μm thick compact blocking-resistant adhesive film was obtained after drying at 120° C.

Example 4

The coated copper foil according to Example 3 was laminated against a 23 μm thick polyethylene terephthalate film at 140° C. In the bond strength test, material failure occurred. In the heat resistance test, neither delamination nor blister formation occurred after 1 day at 155° C. After heating for half an hour at 170° C., a solder bath resistance of more than 45 seconds at 230° C. was observed.

Example 5

The coated copper foil according to Example 3 was laminated against a 50 μm thick Kapton ® film at 170° C. In the bond strength test, material failure occurred. In the heat resistance test, no delamination or blister formation occurred after 1 day at 220° C. After heating for half an hour at 170° C., a solder bath resistance of more than 60 seconds at 288° C. was observed.

Example 6

A polyester film was coated with the reactive system according to Example 1, dried and then laminated with a polyaramide film at 140° C. The bond strength test resulted in material failure. In the heat resistance test, neither delamination nor blister formation occurred after 1 day at 155° C.

Example 7

A polyester film was coated with the reactive system according to Example 1 and, after drying, was hot-pressed with a presspahn substrate. In this case, too, the bond strength test resulted in material failure. In the heat resistance test, no delamination or blistering was observed after 1 day at 130° C.

We claim:

1. A two-component film-forming reactive system for bonding and coating of substrates comprising an aqueous dispersion containing:
    a) at least one resin (I) curable with an epoxide; and b) an epoxide compound as a curing agent (II), wherein, the resin (I) curable with an epoxide comprises at least one member (Ia) selected from the group consisting of carboxylfunctional polyurethane polymers, hydroxyfunctional polyurethane polymers and carboxyfunctional and hydroxyfunctional polyurethane polymers having a sum of an acid number and a hydroxyl number of from 0.1 to 20 and at least one polymer (Ib) selected from the group consisting of acrylate homopolymers containing carboxyl groups, acrylate homopolymers containing methylol groups, acrylate homopolymers containing methylol groups and carboxyl groups, acrylate copolymers containing carboxyl groups, acrylate copolymers containing methylol groups, acrylate copolymers containing carboxyl groups and methylol groups, methacrylate homopolymers containing carboxyl groups, methacrylate homopolymers containing methylol groups, methacrylate homopolymers containing carboxyl and methylol groups, methacrylate copolymers containing carboxyl groups, methacrylate copolymers containing methylol groups and methacrylate copolymers containing carboxyl and methylol groups having a sum of an acid number and a hydroxyl number of from 1 to 15 and a weight average molecular weight of from 50,000 to 300,000.

2. A two component reactive system of claim 1, wherein the ratio by weight between the epoxide curable resins (Ia) and (Ib) is in the range from 98:2 to 50:50.

3. A two component reactive system of claim 1, wherein, the ratio by weight of curable resin (I) to curing agent (II) is in the range from 1:1 to 10:1.

4. A two component reactive system of claim 1, wherein the ratio by weight of curable resin (I) to curing agent (II) is in the range from 1:1 to 5:1.

5. A two component reactive system of claim 1, wherein the epoxide-reactive functional groups of the polyurethane polymers are carboxyl groups.

6. A two component reactive system of claim 1, wherein the polyurethane polymers have an average molecular weight of 7,000 to 50,000.

7. A two component reactive system of claim 1, wherein the polyurethane polymers contain, on average, at least 2 epoxide-reactive functional groups.

8. A two component reactive system of claim 1, wherein the epoxide compounds have an epoxide equivalent in the range from 100 to 4,000.

9. A two-component reactive system of claim 6 wherein the average molecular weight of the polymer is from 10,000 to 30,000.

10. A two component reactive system of claim 1 wherein the sum of the acid value and OH value of the resin I(a) is from 0.3 to 20.

11. A two-component reactive system of claim 10 wherein the sum of the acid value and OH value is from 0.5 to 5.

12. A two-component reactive system of claim 1 wherein the sum of the acid value and OH value of the resin I(b) is in the range of 3 to 15.

13. A two-component reactive system of claim 1 wherein the sum of the acid value and OH value is in the range of 4 to 10.

14. A two-component reactive system of claim 8 wherein the epoxide equivalent is in the range of from 150 to 600.

15. A two component reactive system of claim 1 wherein the epoxide compounds comprise a predominant amount of compounds selected from the group consisting of epoxide compounds based on bisphenol A, epoxide compounds based on Novolak resins, heterocyclic epoxides and mixtures thereof.

16. A two component reactive system of claim 1 further comprising up to 30% by weight, based on the total solids content of the reactive system, of at least one additive selected from the group consisting of catalysts, coupling agents, solvents, wetting agents, foam inhibitors and plasticizers.

17. A process for the production of a heat-reactivatable adhesive-coated substrate resistant to blocking which comprises: applying the reactive system of claim 1 to a substrate by a method selected from the group consisting of roll coating, spray coating, spread coating, knife coating and dip coating to form a coated substrate and drying the coated substrate at a temperature not higher than 120° C.

18. A cured system of claim 1.

* * * * *